(12) United States Patent
Nitsche et al.

(10) Patent No.: US 8,459,675 B2
(45) Date of Patent: *Jun. 11, 2013

(54) STRUCTURAL MOUNTING INSERT HAVING A NON-CONDUCTIVE ISOLATOR

(75) Inventors: Olaf Nitsche, Rochester Hills, MI (US); David Sheasley, Rochester, MI (US); John Gillespie, Romeo, MI (US); Jeanne Bednarski, Ray Township, MI (US)

(73) Assignee: Zephyros, Inc., Romeo, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/162,628

(22) Filed: Jun. 17, 2011

(65) Prior Publication Data

US 2011/0278802 A1 Nov. 17, 2011

Related U.S. Application Data

(63) Continuation of application No. 12/467,478, filed on May 18, 2009, now Pat. No. 7,984,919.

(51) Int. Cl.
*B60G 15/00* (2006.01)
*B32B 5/00* (2006.01)
*B32B 37/00* (2006.01)

(52) U.S. Cl.
USPC ..................... 280/124.155; 156/79

(58) Field of Classification Search
USPC ............. 156/79, 83, 91, 92, 307.7; 277/650, 277/651, 654; 280/124.147, 124.155
See application file for complete search history.

(56) References Cited

U.S. PATENT DOCUMENTS

| | | | |
|---|---|---|---|
| 2,997,122 A | 8/1961 | Frey et al. |
| 3,124,626 A | 3/1964 | Graham et al. |
| 3,451,696 A | 6/1969 | Hagelin et al. |
| 3,586,556 A | 6/1971 | Clark et al. |
| 4,319,768 A | 3/1982 | Youngdale |
| 4,332,397 A | 6/1982 | Steger |
| 4,810,548 A | 3/1989 | Ligon et al. |
| 4,922,596 A | 5/1990 | Wycech |
| 4,978,562 A | 12/1990 | Wycech |
| 4,981,287 A | 1/1991 | Cothenet |
| 5,124,186 A | 6/1992 | Wycech |
| 5,266,133 A | 11/1993 | Hanley |
| 5,344,208 A | 9/1994 | Bien et al. |
| 5,358,397 A | 10/1994 | Ligon et al. |

(Continued)

FOREIGN PATENT DOCUMENTS

| | | |
|---|---|---|
| EP | 0623758 | 11/1994 |
| EP | 0893332 A1 | 1/1999 |

(Continued)

OTHER PUBLICATIONS

International Search Report, Dated Sep. 23, 2010, Application number PCT/US2010/035122.

(Continued)

*Primary Examiner* — Faye M Fleming
*Assistant Examiner* — Laura Freedman
(74) *Attorney, Agent, or Firm* — The Dobrusin Law Firm, P.C.

(57) ABSTRACT

The present invention is predicated upon methods and devices for positively mounting structural members while preventing or substantially limiting exposure of such members to environmental conditions possibly leading to corrosion.

20 Claims, 6 Drawing Sheets

U.S. PATENT DOCUMENTS

| | | | |
|---|---|---|---|
| 5,431,363 A | 7/1995 | Ezzat et al. | |
| 5,487,803 A | 1/1996 | Sweeney et al. | |
| 5,506,025 A | 4/1996 | Otto et al. | |
| 5,552,095 A | 9/1996 | Merser et al. | |
| 5,571,355 A | 11/1996 | Kornylo | |
| 5,575,526 A | 11/1996 | Wycech | |
| 5,743,979 A | 4/1998 | Lorbiecki | |
| 5,755,486 A | 5/1998 | Wycech | |
| 5,766,719 A | 6/1998 | Rimkus | |
| 5,884,960 A | 3/1999 | Wycech | |
| 5,904,024 A | 5/1999 | Miwa | |
| 5,932,680 A | 8/1999 | Heider | |
| 5,933,680 A | 8/1999 | Nishimura | |
| 5,997,786 A | 12/1999 | Arthur et al. | |
| 6,030,701 A | 2/2000 | Johnson et al. | |
| 6,074,506 A | 6/2000 | Herring, Jr. et al. | |
| 6,103,341 A | 8/2000 | Barz et al. | |
| 6,131,897 A | 10/2000 | Barz et al. | |
| 6,199,940 B1 | 3/2001 | Hopton et al. | |
| 6,247,287 B1 | 6/2001 | Takabatake | |
| 6,270,600 B1 | 8/2001 | Wycech | |
| 6,293,572 B1 | 9/2001 | Robbins et al. | |
| 6,368,438 B1 | 4/2002 | Chang et al. | |
| 6,379,762 B1 | 4/2002 | Omichinski | |
| 6,382,635 B1 | 5/2002 | Fitzgerald | |
| 6,422,575 B1 | 7/2002 | Czaplicki | |
| 6,467,834 B1 | 10/2002 | Barz | |
| 6,468,613 B1 | 10/2002 | Kitano et al. | |
| 6,471,285 B1 | 10/2002 | Czaplicki et al. | |
| 6,482,486 B1 | 11/2002 | Czaplicki | |
| 6,511,120 B1 | 1/2003 | Mitts | |
| 6,530,577 B1 | 3/2003 | Busby et al. | |
| 6,543,976 B1 | 4/2003 | Malofsky | |
| 6,585,202 B2 | 7/2003 | Broccardo | |
| 6,668,457 B1 | 12/2003 | Czaplicki | |
| 6,719,293 B1 | 4/2004 | Coles et al. | |
| 6,786,533 B2 | 9/2004 | Bock et al. | |
| 6,793,274 B2 | 9/2004 | Riley et al. | |
| 6,808,774 B2 | 10/2004 | Autterson et al. | |
| 6,855,652 B2 | 2/2005 | Hable et al. | |
| 6,890,021 B2 | 5/2005 | Bock et al. | |
| 6,923,499 B2 | 8/2005 | Wieber et al. | |
| 6,941,719 B2 | 9/2005 | Busseuil et al. | |
| 6,953,219 B2 | 10/2005 | Lutz et al. | |
| 6,969,551 B2 | 11/2005 | Richardson et al. | |
| 6,991,237 B2 | 1/2006 | Kassa et al. | |
| 7,022,400 B2 | 4/2006 | Bolling | |
| 7,077,460 B2 | 7/2006 | Czaplicki et al. | |
| 7,199,165 B2 | 4/2007 | Kassa et al. | |
| 7,249,215 B2 | 7/2007 | Surico et al. | |
| 7,255,388 B2 | 8/2007 | Le Gall et al. | |
| 7,290,828 B2 | 11/2007 | Kosal et al. | |
| 7,318,873 B2 | 1/2008 | Czaplicki et al. | |
| 7,428,774 B2 | 9/2008 | Thomas et al. | |
| 7,469,459 B2 | 12/2008 | Kosal et al. | |
| 7,484,946 B2 | 2/2009 | Nitsche et al. | |
| 7,494,179 B2 | 2/2009 | Deachin et al. | |
| 7,503,620 B2 | 3/2009 | Brennecke et al. | |
| 7,521,093 B2 | 4/2009 | Finerman et al. | |
| 7,784,186 B2 * | 8/2010 | White et al. | 29/897.2 |
| 7,941,925 B2 * | 5/2011 | Larsen et al. | 29/897.2 |
| 7,984,919 B2 | 7/2011 | Nitsche et al. | |
| 8,002,832 B2 | 8/2011 | Castro | |
| 8,070,994 B2 * | 12/2011 | Carlson et al. | 264/46.5 |
| 8,163,116 B2 * | 4/2012 | Riley | 156/79 |
| 8,181,327 B2 * | 5/2012 | Apfel | 29/458 |
| 2002/0024233 A1 | 2/2002 | Kleino | |
| 2004/0018341 A1 | 1/2004 | Richardson et al. | |
| 2004/0076831 A1 | 4/2004 | Hable et al. | |
| 2005/0121942 A1 | 6/2005 | Repp et al. | |
| 2005/0166532 A1 | 8/2005 | Barz | |
| 2005/0244215 A1 | 11/2005 | Prat et al. | |
| 2005/0260399 A1 | 11/2005 | Finerman | |
| 2005/0268454 A1 | 12/2005 | White | |
| 2006/0000186 A1 | 1/2006 | Carlson et al. | |
| 2006/0003044 A1 | 1/2006 | DiNello et al. | |
| 2006/0260204 A1 | 11/2006 | Repp et al. | |
| 2007/0045866 A1 | 3/2007 | Gray et al. | |
| 2007/0090560 A1 | 4/2007 | Kassa et al. | |
| 2007/0101679 A1 | 5/2007 | Harthcock | |
| 2007/0257515 A1 | 11/2007 | Larsen et al. | |
| 2007/0281523 A1 | 12/2007 | Riley | |
| 2008/0012263 A1 | 1/2008 | Dickson et al. | |
| 2008/0061602 A1 | 3/2008 | Czaplicki et al. | |
| 2008/0179913 A1 | 7/2008 | Coon et al. | |
| 2008/0226866 A1 | 9/2008 | Vilcek et al. | |
| 2008/0254214 A1 | 10/2008 | Kassa et al. | |
| 2009/0202294 A1 | 8/2009 | Apfel | |
| 2010/0289242 A1 | 11/2010 | Nitsche et al. | |
| 2012/0090255 A1 * | 4/2012 | Coon et al. | 52/232 |

FOREIGN PATENT DOCUMENTS

| | | |
|---|---|---|
| EP | 1122152 A2 | 8/2001 |
| FR | 2812268 A1 | 2/2002 |
| FR | 2881458 A1 | 8/2006 |
| GB | 1541482 A | 3/1979 |
| GB | 2224683 A | 5/1990 |
| JP | 2004/036660 | 2/2004 |
| SU | 1803616 A1 | 3/1993 |
| WO | 2000/027920 A1 | 5/2000 |
| WO | 2005/077634 A2 | 8/2005 |
| WO | 2005/002950 A2 | 11/2005 |

OTHER PUBLICATIONS

Co-pending U.S. Appl. No. 11/115,668, filed Apr. 27, 2005 published as 2005/0260399.
Co-pending U.S. Appl. No. 11/151,957, filed, Jun. 14, 2005, published as 2006/0000186.
Co-pending U.S. Appl. No. 11/944,075, filed Nov. 21, 2007, published as 2008/0061602.
Co-pending U.S. Appl. No. 11/767,755, filed Jun. 25, 2007, published as 2007/0257515.
Co-pending U.S. Appl. No. 11/188,586, filed Jun. 25, 2005, published as 2005/0268454.
Co-pending U.S. Appl. No. 11/742,025, filed Apr. 30, 2007, published as 2007/0281523.
Co-pending U.S. Appl. No. 11/020,717, filed Dec. 22, 2004, published as 2005/0166532.
Co-pending U.S. Appl. No. 11/969,389, filed Jan. 4, 2008, published as 2008/0179913.
Co-pending U.S. Appl. No. 11/136,742, filed May 25, 2005, patent No. 7,428,774.
Co-pending U.S. Appl. No. 10/404,831, filed Apr. 1, 2003, patent No. 6,969,551.
Co-pending U.S. Appl. No. 09/939,152, filed Aug. 24, 2001, patent No. 6,855,652.
Co-pending U.S. Appl. No. 13/185,589, filed Jul. 19, 2011.
International Preliminary Report on Patentability dated Apr. 14, 2009, PCT/US2008/052004.
European Office Action dated Oct. 12, 2011, European Application No. 08 728 266.1-1252.
Russian Office Action dated Jul. 13, 2011, Russian Application No. 2009132481.
Chinese Office Action dated Mar. 30, 2011, Chinese Application No. 200880009527.3.
Co-pending U.S. Appl. No. 11/969,389, filed Jan. 4, 2008, patented as 8,002,332.
Co-pending U.S. Appl. No. 12/367,152, filed Feb. 6, 2009, now U.S. Patent Application No. 2009/0202294.
International Search Report, Dated Jun. 24, 2008, Application No. PCT/US2008/052004.
Co-pending U.S. Appl. No. 12/467,478, May 8, 2009, Patented as 7,984,919 on Jul. 26, 2011.
International Preliminary Report on Patentability, dated Aug. 11, 2011, PCT/US2010/035122.
European Office Action, application No. 10 720 698.9 dated Sep. 10, 2012.

* cited by examiner

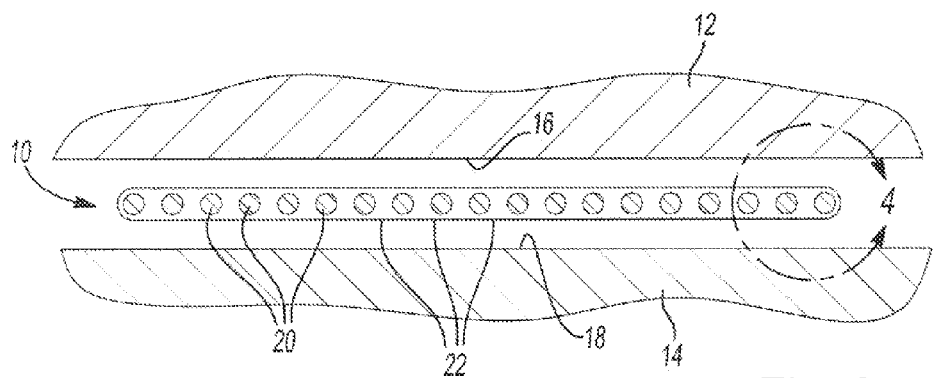
Fig-3
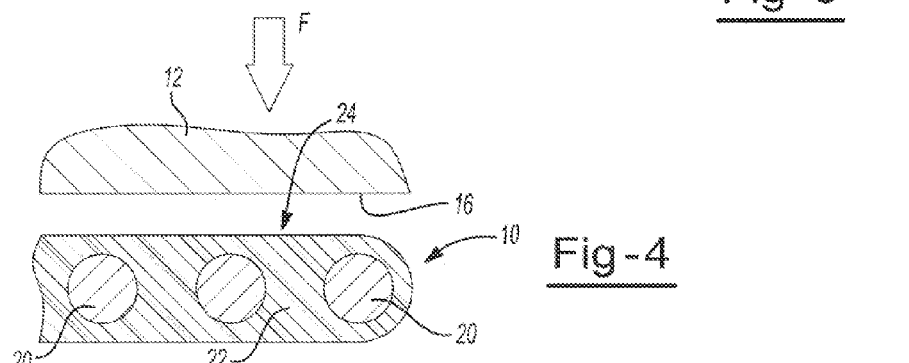
Fig-4
Fig-5
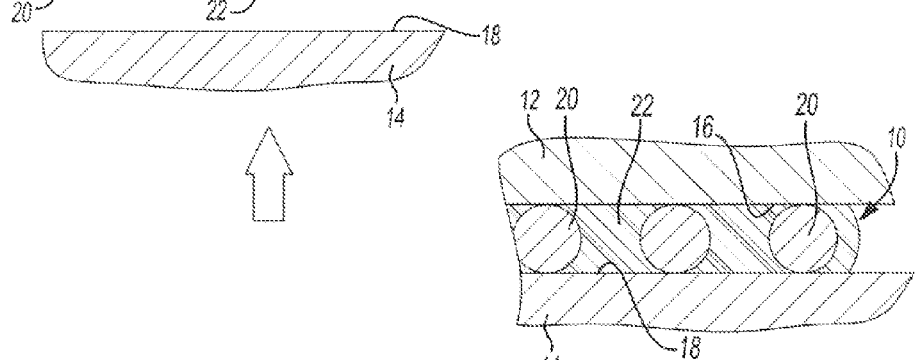
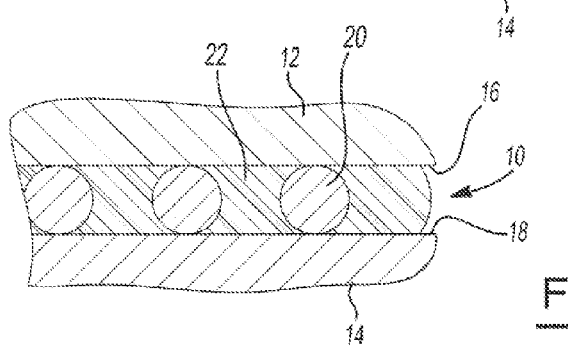
Fig-6

STRUCTURAL MOUNTING INSERT HAVING A NON-CONDUCTIVE ISOLATOR

CLAIM OF PRIORITY

This application is a continuation of Ser. No. 12/467,478, filed on May 18, 2009, now U.S. Pat. No. 7,984,919, all of which are incorporated herein by reference for all purposes.

FIELD OF THE INVENTION

The present invention is predicated upon methods and devices for the protection of two or more joined components from corrosion, loosening of fasteners or structural bonding (e.g., torque fall off) or any combination of these issues.

BACKGROUND OF THE INVENTION

For many years, fuel economy has become more emphasized in the automotive industry. There are several approaches for reducing the fuel consumption of cars, one is the use of light weight materials such as aluminum and magnesium. These materials can reduce the weight of a car, but due to their lower strength they can barely meet current crash-safety standards. As such, bimetallic constructions made of steel (inner part) and aluminum (outer part) are proposed. Such materials, however, suffer from drawbacks. As one example, in mixed material parts, the joint areas are known to have poor or no corrosive resistance against corrosive environments. More particularly, the expansion/contraction characteristics of the materials during exposure to temperature variances can limit the ability of the materials to seal and/or can degrade materials. As another example, such materials can limit that ability of members to be attached to one another or have a limited ability to enhance the attachment of members to each other. More so, typical materials have little or no expansion capabilities which may require additional applications of the material to completely fill open spaces between the joining structures, which can be time consuming and costly. As another example, upon the application of fasteners, the material may be displaced thereby forming additional open spaces either surrounding the fastener or within the fastener as it pierces the joining structures. These additional open spaces may partially remain open and susceptible to the surrounding environment (e.g., moisture). Thus, the present invention provides an insert that acts as a seal, a structural adhesive material, both or the like wherein the material at least assists in overcoming one of the aforementioned drawbacks or other drawbacks.

SUMMARY OF THE INVENTION

The present invention seeks to improve upon prior joint assemblies by providing a structural mounting insert for sealing and isolating two dissimilar materials. In a first aspect, the present invention contemplates an insert for adhesion, sealing, and isolating comprising: a generally non-conductive isolator having a melting point or glass transition temperature greater than about 115° C.; a matrix material in contact with the isolator and having a tackiness in its green state, the matrix material being cured by exposure to heat after installation of the insert, wherein the tackiness is sufficiently high so that it resists displacement after application to a surface; wherein upon installation in a joint between two dissimilar materials the isolator bonds the two dissimilar materials and resists any displacement that would bring the two dissimilar materials into direct contact with one another.

This aspect may further be characterized by one or any combination of the following features: the isolator includes a network of elongated fibers that are constrained relative to each other against lateral displacement; fibers within the isolator have a longitudinal axis oriented generally non-parallel with any contacting edge of any of the dissimilar materials; the outer surface is part of a non-tacky handling film that lies over the matrix material; the matrix material is expandable, upon exposure to an elevated temperature; the insert includes one or more apertures having edges that are at least partially brought together upon being applied to a non-planar surface of either the dissimilar materials so that the shape of the insert generally corresponds to the non-planar surface thereby reducing or eliminating any gaps formed between the non-planar surface and the insert, bunching of the insert, or both relative to a similar insert without the one or more apertures being applied to the non-planar surface; upon activation of the matrix material, the matrix material flows or expands to fill any open spaces remaining within the one or more apertures; the insert upon being subjected to a force sufficient to deflect the insert, the insert is capable of elastically returning to its original state; the insert upon being subjected to a force sufficient to deflect the insert, the insert permanently deforms; the insert includes a removable release film in contact with the matrix material having the first tackiness and a handling film in contact with the outer surface having the second tackiness that is substantially tack free.

In another aspect, the present invention contemplates an insert for adhesion, sealing, and isolating comprising: a generally non-conductive isolator defining a plurality of openings therethrough by a network of elongated strands that are constrained relative to each other against lateral displacement, the elongated strands being formed of a polyamide, a polyester, glass fibers, or any combination thereof; a matrix material embedded over the isolator and having a first tackiness in its green state, the matrix material being cured by exposure to heat after installation of the insert, wherein the first tackiness is sufficiently high so that it resists displacement after application to a surface; an outer surface having a second tackiness that is less than the first tackiness; wherein the isolator includes a thickness that ranges from about 0.1 mm to about 0.8 mm; wherein upon installation in a joint between two opposing members having dissimilar materials, the isolator resists any displacement that would bring the two dissimilar materials into direct contact with each other; wherein upon application of heat, the matrix material expands to fill the plurality of openings formed through the elongated strands and to seal and bond the isolator and a connection region between the dissimilar materials.

This aspect may further be characterized by one or any combination of the following features: the insert includes one or more apertures having edges that are at least partially brought together upon being applied to a non-planar surface of either the two opposing members so that the shape of the insert generally corresponds to the non-planar surface thereby reducing or eliminating any gaps formed between the non-planar surface and the insert, bunching of the insert, or both relative to a similar insert without the one or more apertures being applied to the non-planar surface; upon activation of the matrix material, the matrix material flows or expands to fill any open spaces remaining within the one or more apertures; the elongated strands include end stands extending generally transversely to pick strands to form the network such that a ratio of end-strands per inch to pick-strands per inch ranges from about 2:1 to about 1:2; the plurality of openings are of equally shaped and spaced openings therethrough; the insert includes a removable release film in contact with the matrix material having the first tackiness and a handling film in contact with the outer surface having the second tackiness that is substantially tack free.

In a further aspect, the present invention contemplates a mounting assembly between a shock tower housing and frame members of an automotive vehicle, the shock tower housing assembly comprising: an outer wall extending generally transversely from a first housing portion to form a cavity therebetween, the first housing portion having an opening extending therethrough for accessing a portion of a shock absorber located within the cavity; a first mounting portion for attachment to a first vehicle frame member at a connection region, the first mounting portion having a mounting surface for mounting the first mounting portion to the first vehicle frame member; a second mounting portion for attachment to a second vehicle frame member at a connection region, the second mounting portion having a mounting surface for mounting the second mounting portion to the second vehicle frame member; structural mounting inserts comprising: a non-conductive structural mesh material shaped to correspond to the shape of the connection region, the non-conductive structural mesh material forming a plurality of equally shaped and spaced openings therethrough; and a heat activatable material encased over at least a portion of the non-conductive structural mesh material and in the plurality of openings formed therethrough, the heat activatable material being formed of a pliable material; and wherein the structural mounting inserts include a first and second structural mounting insert, the first structural insert further having one or more apertures passing through the first structural mounting insert, the one or more apertures having edges that are at least partially brought together upon being applied to the mounting surface of the first mounting portion so that the shape of the first structural mounting insert corresponds to a non-planar surface of the first mounting surface thereby reducing or eliminating any gaps formed between the non-planar surface and the first structural mounting insert, bunching of the first structural insert, or both relative to a similar structural mounting insert without the one or more apertures being applied to the non-planar surface; and a plurality of fasteners extending through the frame members and the inserts to the shock tower housing; wherein the material of the first and second mounting portions are dissimilar to the material of the first and second frame members and upon mounting the first and second mounting portions to the first and second vehicle frame members, the non-conductive structural mesh material resists any displacement that would bring the two dissimilar materials into direct contact with each other; wherein upon application of heat, the heat activatable material expands to fill the plurality of openings formed through the structural mesh and to seal and bond the structural mesh material and the connection region of the first mounting portion and the first vehicle frame member and the connection region of the second mounting portion and the second vehicle frame from the surrounding environment, and wherein upon application of heat, the heat activatable material expands to fill the surrounding area where the plurality of fasteners extend through the structural mounting inserts to substantially limit or prevent moisture from entering therein.

This aspect may further be characterized by one or any combination of the following features: upon activation of the matrix material, the matrix material flows or expands to fill any open spaces remaining within the one or more apertures; the isolator includes a network of elongated strands that are constrained relative to each other against lateral displacement such that the strands a longitudinal axis oriented generally non-parallel with any contacting edge of any of the dissimilar materials, and wherein the elongated strands includes a polyamide, a polyester, glass fibers, or any combination thereof.

In another aspect, the present invention contemplates a mounting assembly between a shock tower housing and frame members of an automotive vehicle, the shock tower housing assembly comprising: an outer wall extending generally transversely from a first housing portion to form a cavity therebetween, the first housing portion having an opening extending therethrough for accessing a portion of a shock absorber located within the cavity; a first mounting portion for attachment to a first vehicle frame member at a connection region, the first mounting portion having a mounting surface for mounting the first mounting portion to the first vehicle frame member; a second mounting portion for attachment to a second vehicle frame member at a connection region, the second mounting portion having a mounting surface for mounting the second mounting portion to the second vehicle frame member; structural mounting inserts comprising a heat activatable material, wherein the structural mounting inserts include a first and second structural mounting insert, the first structural insert further having one or more apertures passing through the first structural mounting insert, the one or more apertures having edges that are at least partially brought together upon being applied to the mounting surface of the first mounting portion so that the shape of the first structural mounting insert corresponds to a non-planar surface of the first mounting surface thereby reducing or eliminating any gaps formed between the non-planar surface and the first structural mounting insert; and a plurality of fasteners extending through the frame members and the inserts to the shock tower housing; wherein the material of the first and second mounting portions are dissimilar to the material of the first and second frame members and upon mounting the first and second mounting portions to the first and second vehicle frame members, the structural mounting inserts resist any displacement that would bring the two dissimilar materials into direct contact with each other; wherein upon application of heat, the heat activatable material expands to seal and bond the connection region of the first mounting portion and the first vehicle frame member and the connection region of the second mounting portion and the second vehicle frame from the surrounding environment, and wherein upon application of heat, the heat activatable material expands to fill the surrounding area where the plurality of fasteners extend through the structural mounting inserts to substantially limit or prevent moisture from entering therein.

BRIEF DESCRIPTION OF THE DRAWINGS

FIG. 3 illustrates a cross sectional view of the structural insert shown in FIG. 1 with the addition of a first and a second member prior to joining according to the teachings of the present invention.

FIG. 4 illustrates an enlarged view of the structural mounting insert shown in FIG. 3.

FIG. 5 illustrates the structural mounting insert shown in FIG. 4 after joining of the two components.

FIG. 6 illustrates the structural mounting insert shown in FIG. 5 after activation of one available material according to the teachings of the present invention. (show expansion)

DETAILED DESCRIPTION OF THE INVENTION

Figure 1:
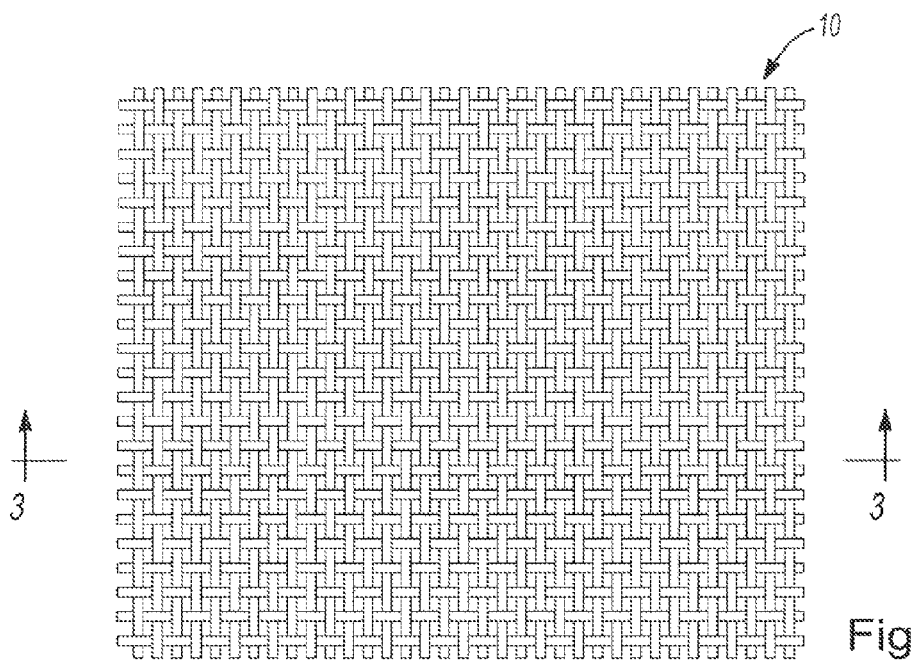
FIG. 1 illustrates a top view of one configuration of the structural mounting insert according to the teachings of the present invention.
Figure 2:
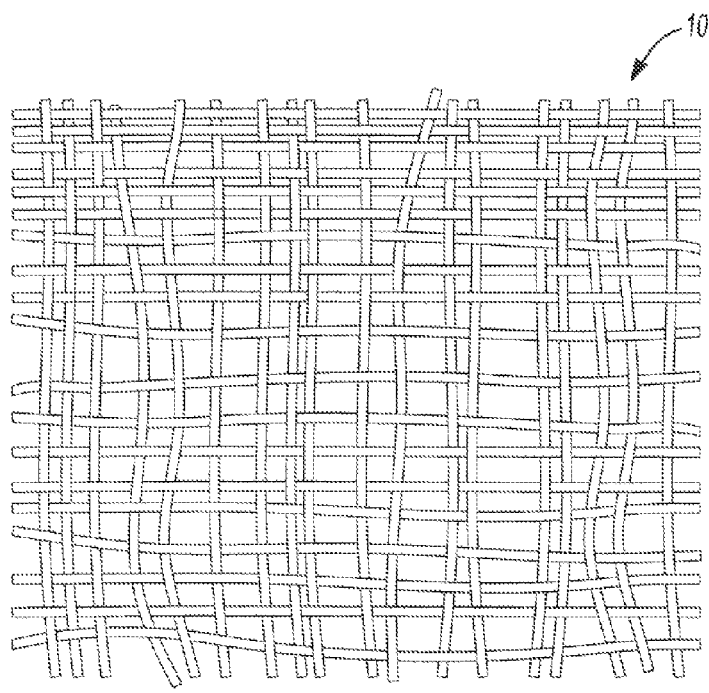
FIG. 2 illustrates a top view of another configuration of the structural mounting insert according to the teachings of the present invention

The present invention is predicated upon methods and devices for positively mounting structural members while preventing or substantially limiting exposure of such members to environmental conditions possibly leading to corrosion. Referring to the drawings, this is achieved through the use of an insert 10 placed between a first and second member 12, 14, respectively, prior to joining of the same. The insert includes a positive locating feature for maintaining a distance between the first and second members and a sealer that may be configured to fill open space between the first and second member, surround the insert and joining portions of the first and second members with the insert, or both. The sealer may be activatable, pliable or both to seal both the insert and the contacting portions 16, 18 of the structural members from the surrounding environment.

An additional advantage of the present invention is that it substantially limits or prevents torque fall off or the loosening of fasteners (e.g., bolts or otherwise) during thermal cycling or otherwise of the joined members. For example, during repeated cycles of warming and cooling typical sealing devices expand and contract due to the temperature change. Since the only spacer material used in these prior devices comprise the sealing material itself, it is common that moisture enters the gaps formed by the seal during this thermal cycling. Also, it is common that prior sealing devices also undergo creep causing gaps to form which may be increased at elevated temperatures.

The present invention overcomes these and other problems by providing a higher strength material for forming a gap or otherwise providing an isolator between the first and second members for maintaining a spacer layer therebetween. The sealer of the insert then seals any gaps formed between the first and second members and surrounds the insert and/or fasteners thereby substantially limiting or preventing corrosion of the connecting regions of the first and second members. This is because due to the combination of the high strength isolator and the sealing material forming and generally maintaining the spacer layer between the first and second members, any direct contact (e.g., infiltrating contact) between the first and second is substantially limited or prevented. Furthermore, because, the sealing material seals the gaps between the first and second members, moisture is substantially limited or prevented from contacting the contacting points of the first and second member, which further prevents electrolytes from initiating corrosion since they originate from moisture.

For example, when the first and second members are formed of dissimilar materials (e.g., different metals such as steel and aluminum), the combination of the high strength isolator and the sealer form a spacer layer so that any displacement that would bring the first and second members into direct contact with each other may be resisted. Resisting direct contact between the first and second members prevents a galvanic couple between the dissimilar materials in the presence of an electrolyte, which may substantially or completing reduce corrosion of one or both of the dissimilar materials.

Generally, the insert 10 includes an isolator 20 comprising a high strength material configured to resist any deformation that would bring the first and second members into direct contact upon the application of force used to join the structural members. The insert also includes an encasing 22 or otherwise that is attached or becomes attached to the isolator. The encasing 22 is at least partially pliable so as to surround the insert and the contacting points or region of the structural members.

Upon joining of the first and second structural members, the encasing may be activated or otherwise deformed to cause sealing of the insert and contact points of the structural members thereby limiting or preventing contact between the first and second members and/or exposure to corrosion driving components such as water, which can corrode the structural components.

It should be appreciated that the foregoing is just one of many examples and advantages of the present invention and the follow description provides, implicitly and/or explicitly, other examples and advantages of the present invention, which are further supported by the drawings.

Isolator-Spacer Material

The insert includes an isolator 20 comprising a flexible or rigid material that is configured to act as a spacer between the first and second members 12, 14. The isolator is configured in strength to substantially resist displacement that would bring the first and second members into direct contact during attachment thereof. Accordingly, it is contemplated that the isolator is formed of a high strength material.

Suitable materials that may be used to form the isolator includes materials such as metal, plastic, glass, ceramic, rubber or otherwise. The isolator may be formed of hydrophobic material or may be laminated to become hydrophobic. In one configuration, the isolator is formed of metal (such as shim stock or otherwise) due to its flexibility (e.g. elasticity) and high strength for resisting plastic deformation. Examples of suitable metal materials include stainless steel, alloyed steels, coated or non-coated steel, galvanized steel, low or high carbon steel, cobalt, other metallic materials, the like or otherwise. In one preferred embodiment, the isolator includes materials that are free of metal (e.g., non-metallic). Of course other specific materials are available such as those commonly used in textiles or otherwise. For certain applications, it may be preferable for the strengthening material to be one or more non-conductive threads or wire (e.g., elongated filament, fibrous, or fabric material), which may be applied as a mat, a cloth, a roving, a netting, a mesh, a scrim, or the like. In such embodiments, the strengthening material may be composed, for example, woven or unwoven fibers, filaments or the like of cotton, glass (e.g., E-glass or S-glass), fiberglass, Mylar, nylon, polyester, carbon, aramid, plastics, polymers (e.g., thermoplastics such as polyamides (e.g., nylon), PET (e.g., Mylar), polycarbonate, polyethylene, polypropylene, polybutylene (e.g., polybutylene terephthalate), polystyrene, polyurethane, vinyl, or any combination thereof, or other materials. As used herein, "threads," or "wire" connotes a single filament of material, a braided bundle of filaments, or an unbraided bundle of filaments. As discussed herein, mesh connotes a material that has a regular pattern (e.g., a consistent opening configuration) and a scrim connotes a material that has a random pattern (e.g., a variable opening configuration).

In other applications, it may appreciable that the strengthening material may be bead-like particles, aggregates, hollow material (e.g., hollow particle), or otherwise, or any combination. In such embodiments, the strengthening material may be composed, for example, of particles or the like of glass (e.g., E-glass or S-glass), fiberglass, nylon, polyester, carbon, aramid, plastics, polymers (e.g., thermoplastics such as polyamides (e.g., nylon), polycarbonate, polyethylene, polypropylene, polybutylene (e.g., polybutylene terephthalate), polystyrene, polyurethane, vinyl, or any combination thereof), or other materials.

In one preferred embodiment, the strengthening material may be formed of glass filaments (e.g., fibers) such as a weave or roving of glass filaments (e.g., as a mesh, a scrim, or otherwise). Exemplary glass filament (e.g., fiber) strengthening materials include materials sold under product designation 1521 and 7533, which are commercially available from BGF Industries, Inc., Greensboro, N.C. In another preferred embodiment, the strengthening material formed of polyamides (e.g., nylon), polybutylene (e.g., polybutylene terephthalate), or both such as an injection or extrusion molding of polymeric filaments (e.g., as a mesh, scrim, or otherwise). Exemplary polyamide strengthening materials include materials sold under product designation 14410 and 15400, which are commercially available from DelStar Technologies, Inc., Middletown, Del. The skilled artisan will recognize that, although preferred materials have been disclosed herein, various alternative materials may be chosen for the strengthening material depending upon the needed or desired properties or functionality for a particular application.

In general, the desired characteristics of the isolator include relatively high stiffness, high strength, high melting point, high glass transition temperature, and adhesion durability properties. In this manner, the material does not generally interfere with the materials systems employed by automobile manufacturers. The isolator may include a melting point of at least about 100° C., typically at least about 175° C., and more typically at least about 200° C. However, the melting point of the isolator may be even higher such as at least about 1000° C. (e.g., about 1500° C.) depending on the application. Furthermore, the isolator may include a glass transition temperature of at least about 50° C., typically at least about 100° C. and more typically at least about 200° C. However, the glass transition temperature of the isolator may be even higher such as at least about 400° C. (e.g., about 570° C.) depending on the application. For example, it should be appreciated that in the isolator (e.g., non-conductive isolator) may have a melting point or glass transition temperature greater than about 150° C., typically greater than 200° C., or more typically greater than 300° C.

In a first exemplary configuration, as shown in FIGS. 1-6, the isolator includes a network of elongated fibers (e.g., filaments) that are constrained relative to each other against lateral displacement. The fibers within the isolator have a longitudinal axis that may be oriented generally non-parallel with any contacting edge (e.g., the contacting portions 16, 18) of any of the first and second members.

The isolator 20 is formed with or otherwise includes a plurality of openings 24 formed therein for receiving at least a portion of the matrix material 22. These openings may be formed using any available forming technique (such as extruding, weaving, or otherwise). The size of the openings 24 may vary for each application. It is contemplated that the openings includes a diameter less than 5 mm, 2 mm, 1 mm, 0.5 mm, 0.25 mm or smaller. Also, it is contemplated that the average diameter may be between 0.25 mm to 1.5 mm, between 0.5 mm to 1.5 mm, or otherwise.

The openings may be geometrical or non-geometrical (i.e. irregular) in shape. It should be appreciated that the shape and size of the openings may vary throughout the isolator, FIG. 2, so that the isolator includes a variable opening configuration. However, in one preferred configuration the shape and size of the openings are consistent (e.g., equally shaped and/or spaced) throughout the isolator, FIG. 1, so that the isolator includes a generally consistent opening configuration. It should be appreciated that the shape and/or size and the configuration of the openings (e.g., variable or consistent) depends upon the needs of a given application. When the isolator includes openings, and particularly where that component is a mesh material, a scrim material, or otherwise, there are typically at least 10, more typically at least 150 and even more typically at least 300 openings per square inch, and/or less than about 3000, more typically less than about 800 and even more typically less than about 500 openings per square inch.

Available shapes of the openings include circular, triangular, square or rectangular, hexagonal, octagonal, parallelogram, etc, or otherwise. The openings may form angles that are at least about 40°, and preferably at least about 60° (e.g., about 90°). Furthermore, the openings may form angles that are less than 140°, and more preferably less than about 120°. For example, the opening may form angles from about 40° to about 140°, and preferably from about 60° to about 120°. The threads form generally parallelogram shaped openings (e.g., opposing angles of about 60° and about 120°, respectively). However, in one preferred configuration as shown in FIG. 1, the threads form generally square or rectangular shaped openings (e.g., opposing angles of about 90°). It is appreciated that the term "about" when referencing the angles of the openings, provides that the angles may vary +/−5°.

The isolator may be formed using different forming techniques. The isolator may be woven or non-woven from one or a plurality of threads (e.g., yarn), wires, or the like. The isolator may comprise or be formed similar to that of a screen (e.g., mesh), a fabric (e.g., a scrim), or the like. With regards to woven configurations, the isolator may be formed of a mesh material, such as metallic or polymer mesh, which results in the forming of openings 24. With respect to non-woven configurations, the isolator may be an extruded mesh material such as a polymeric mesh, which results in the forming of openings 24. Other techniques are available.

The thickness of the isolator may vary depending upon a number of factors such as the type of material used, the type of forming process used, the number of openings, or the application. The thickness may also be dependent upon the volume of open space between the first and second members to be filled or the amount of matrix material. Still further, the thickness may be based upon the pliability of the isolator. Examples of suitable thicknesses include between about 0.05 to about 5 mm or between about 0.1 to 0.8 mm or otherwise.

The diameter of the threads or wires forming the isolator may also vary for each application. It is contemplated that the thread or wires includes a diameter less than 10 mm, 5 mm, 2 mm, 1 mm, 0.5 mm, or 0.1 mm or smaller. Also, it is contemplated that the average diameter of the threads or wires may be between 0.1 mm to 2 mm, between 0.2 mm to 1 mm, between 0.25 mm and 0.8 mm or otherwise. It should be appreciated that the shape and size of the threads may be consistent throughout the isolator. However, in one preferred configuration the shape and size of the threads may vary throughout the isolator. Also, the cross-sectional shape of the threads may be circular, elliptical, square, rectangular, heptagon, hexagon, parallelogram, or otherwise.

The number of threads may vary for each application. It is contemplated that the number of threads (e.g., thread count) may include about 5, 10, 15, 20, 25, 30, 35, or more strands/inch. Examples of suitable number of strands include between about 5 to about 75 strands/inch or between about 12 to about 35 strands/inch, or otherwise. For example, the thread count may be 18×18 Ends×Picks (per inch) such that the isolator may include 18 end-strands/inch by 18 pick-strands/inch (e.g., 18 ends in every inch of fill direction and 18 picks in every inch of warp direction). It should be appreciated that the thread count, more particularly, the ends (e.g., warp yarns) relative to the picks (e.g., fill yarns) of the isolator may vary from about 1 strand to about 25 strands. For example, in one embodiment, the thread count may be 18×22 Ends×Picks (per inch) such that the isolator may include 18 end-strands/inch by 22 pick-strands/inch (e.g., 18 ends in every inch of fill direction and 22 picks in every inch of warp direction). In another embodiment, the thread count may be 30×18 Ends×Picks (per inch) such that the isolator may include 30 end-strands/inch by 18 pick-strands/inch (e.g.; 30 ends in every inch of fill direction and 18 picks in every inch of warp direction). Other thread count configurations are contemplated for different applications. Also, it is contemplated that the ratio of end-strands/inch relative to pick-strands/inch may range from about 2:1 to about 1:2, and typically from about 1.7:1 to about 1:1.7 end-strands in every inch of the fill direction to pick-strands in every inch of the warp direction.

With respect to the different embodiments contained herein, or otherwise, it is contemplated that all or a portion of the isolator may be coated, such as with a sealer or otherwise.

Matrix Material-Sealant Material

The insert also includes a matrix material comprising a sealant material adapted to maintain a spacer layer between the first and second members and seal the insert and connecting regions of the first and second members. The matrix material may be configured to displace (e.g. elastically, plastically or both) during joining of a first and second member. The matrix material is provided with the isolator during use or application to the first and/or second member. Preferably, the matrix material is attached or otherwise joined with the isolator to improve installation and reduce manufacturing cost.

In one configuration, the matrix material substantially or entirely encases the isolator. The matrix material may be applied to the isolator using common techniques as described herein. However, in one preferred configuration, the isolator is dipped or otherwise immersed by the matrix material such that the isolator may be embedded in the matrix material.

The matrix material may be formed of any of the material components discussed herein. This includes sealant materials, materials to reduce noise vibration harshness, structural materials or otherwise. However, in a preferred configuration the material is configured to form (and generally maintain) a substantially continuous spacer layer between the first and second members to prevent direct contact relative to one another. Also, it should be appreciated that a seal may be formed to prevent moisture (such as corrosive fluids of any kind, including water or otherwise) from entering between the matrix material and the first or second members.

The matrix material may comprise a non-activatable material, an activatable material, or a combination of both. For example, the matrix material may comprise a non-activatable material, such as a typical gasket or otherwise used or capable to seal components and which undergoes little to no physical or chemical change upon application of energy. Alternatively, the matrix material may comprise an activatable material which does undergo physical and/or chemical change upon application of energy, as described herein. Still further, it is further contemplated that only a portion of the matrix material may be activatable.

In one preferred configuration, the matrix material comprises or includes an activatable material to maintain a generally continuous spacer layer and to cause sealing. More preferably, the matrix material comprises a heat activatable material configured to expand upon application of energy (such as heat or otherwise). In another preferred configuration, the matrix material comprises a non-expandable material and/or a non-activatable material, wherein the matrix material forms about the contact region of the first and second members and fills open space therebetween. Additional suitable materials and forming techniques for the matrix material are discussed below.

The expandable material may be applied to the carrier using molding or shaping techniques, which may be automatic, semi-automatic or manual. Such techniques include blow molding, rotation molding, injection molding, compression molding casting, or otherwise. In one highly preferred configuration, the expandable material is applied to the carrier through an extrusion (e.g. co-extrusion) process.

The thickness of the matrix material may vary depending upon a number of factors such as whether and to what level the matrix material is activatable or expandable. The thickness may also be dependent upon the volume of open space between the first and second members, or about the isolator, to be filled. Still further, the thickness may be based upon the pliability of the matrix material. Examples of suitable thicknesses include between about 0.05 to about 10 mm or between about 0.1 to 5 mm or otherwise.

The expandable material may be formed of several different materials. Generally speaking, the member may utilize technology and processes for the forming and applying the expandable material such as those disclosed in U.S. Pat. Nos. 4,922,596; 4,978,562; 5,124,186; 5,884,960; and 7,199,165, all of which are expressly incorporated by reference for all purposes. Typically, when used for reinforcement, the expandable material form a high compressive strength and stiffness heat activated reinforcement material (e.g. foam) having foamable characteristics. For example, the compressive strength modulus of the material is preferably greater than about 100 MPa and more preferably greater than about 800 MPa and still more preferably greater than about 1500 MPa.

The material may be generally dry to the touch or tacky and can be placed upon the isolator or the like in any form of desired pattern, placement, or thickness, but is preferably of substantially uniform thickness. Exemplary expandable materials are L-5510 and L-5520 available through L&L Products, Inc. of Romeo, Mich.

Examples of other suitable tacky or non-tacky materials include L-2663, L-2610, L-2609, L-2701 or other similar material available through L&L Products, Inc. of Romeo, Mich.

Though other heat-activated materials are possible for the expandable material, a preferred heat activated material is an expandable polymer or plastic, and preferably one that is foamable. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing or sealing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material or a thermoset material, the structural foam is usually initially processed as a flowable thermoplastic material before curing. Such a material will typically cross-link upon curing, which makes the material incapable of further flow.

An example of a preferred structural foam formulation is an epoxy-based material that is commercially available from L&L Products of Romeo, Mich., under the designations L-5206, L-5207, L-5208, L-5209, L-8100, L-8101, L-8103, and L-8503. One advantage of the preferred structural foam materials over prior art materials is that the preferred materials can be processed in several ways. The preferred materials can be processed by injection molding, extrusion compression molding, overmolding onto a carrier or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means which are well known in the art.

While the preferred materials for fabricating the expandable material have been disclosed, the expandable material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference. See also, U.S. Pat. Nos. 5,766,719; 5,755,486; 5,575,526; and 5,932,680, (incorporated by reference). In general, the desired characteristics of the expandable material include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L-5207, L-5208, L-8100, L-8101, L-8103, and L-8503, which are commercially available from L & L Products, Romeo, Mich.

Typically, when used for reinforcement, the expandable material is configured to expand to a volume that is between 110% and 500% more typically between 130% and 300% and even more typically between 150% and 250% of its original unexpanded volume. It is also contemplated that, when the system of the present invention is used for sealing or baffling, the expandable material may be designed to absorb or attenuate sound, block off and prevent passage of materials through a cavity or the like. As such, the expandable material may be configured to expand to a volume that is at least 200%, at least 400%, at least 800%, at least 1600% of even at least 3000% or its original unexpanded volume. Examples of such expandable material are discussed in U.S. Pat. No. 7,199,165, expressly incorporated by reference.

Although the expandable material may be heat activated, it may be otherwise additionally or alternatively activated by other stimuli to cure, expand, bond, combinations thereof or the like. Without limitation, such material may be activated by alternative stimuli such as, pressure, moisture, chemicals, ultraviolet radiation, electron beam, induction, electromagnetic radiation or by other ambient conditions. As particular examples, the material may be a two-component adhesive material that expand, cure, adhere, or a combination thereof upon adding one component to the other. Examples of materials include epoxy/amine materials and epoxy/acid materials.

In applications where the expandable material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an assembly plant, when the foam is processed along with the automobile components at elevated temperatures or at higher applied energy levels, e.g., during paint curing steps. While temperatures encountered in an automobile assembly operation may be in the range of about 150° C. to 200° C. (about 300° F. to 400° F.), body and paint shop applications are commonly about 90° C. (about 200° F.) or slightly higher. Similarly, during manufacturing of other transportation device (e.g., bicycle, motorcycles, all terrain vehicles or otherwise), higher temperatures may also be used during paint curing process (such as powder coat applications) or otherwise. In one configuration, the material becomes reactive at temperatures greater than about 120° C., or greater than about 150° C. or even greater than about 160° C. If needed, blowing agent activators can be incorporated into the composition to cause expansion at different temperatures outside the above ranges.

By specific example, it is contemplated that the material may be cured in a powder coat paint cure operation. In such an operation, the material may be exposed to a temperature range between approximately 120°-230° C. with an exposure time between about 10 minutes to 60 minutes. Also, it is contemplated that the material may be cured in a precipitation hardening cure operation. In this operation, the material may be exposed to a temperature range between approximately 150°-230° C. with an exposure time between about 45 minutes to 8 hours.

Generally, suitable expandable foams have a range of expansion ranging from approximately 0 to over 1000 percent. The level of expansion of the expandable material may be increased to as high as 1500 percent or more. Typically, strength and stiffness are obtained from products that possess lower expansion.

Some other possible materials for the expandable material include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automotive or other vehicle manufacturers (e.g., motorcycle, bicycle, all terrain vehicles or otherwise). Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in U.S. Pat. No. 6,422,575, hereby incorporated by reference.

In addition, as discussed previously, preformed patterns may also be employed such as those made by extruding a sheet (having a flat or contoured surface) and then die cutting it according to a predetermined configuration in accordance with the chosen structure, carrier member or the like, and applying it to thereto.

The skilled artisan will appreciate that the system may be employed in combination with or as a component of a conventional sound blocking baffle, or a vehicle structural reinforcement system, such as is disclosed in U.S. Pat. Nos. 6,482,486 and 6,467,834, incorporated by reference herein.

It is contemplated that the material of the expandable material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397, hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In another preferred configuration, as previously mentioned, the matrix material may be non-activatable and/or non-expandable. In this configuration, it is contemplated that upon application of force, and optionally activation, the matrix material plastically deforms to surround the insert and the contact region of the first and second members to cause sealing of the same. Accordingly, in one configuration, the matrix material may comprise a gasket. For example, the matrix material may comprise any suitable gasket used for sealing joined components.

In one aspect, the insert may be configured to be a weld through product. When incorporated as a weld through product, the matrix material may be configured to provide additional sealant around the weld. Examples of such weld through materials are disclosed in U.S. Patent Publication Nos. 2004/0076831 and 2005/0260399, hereby incorporated by reference.

Insert

The shape and size of the insert may vary between applications. It is contemplated that the insert may be generally square or rectangular in shape. However, other shapes include circular, elliptical, heptagonal, hexagons, etc, or otherwise, including regular or irregular shapes are contemplated.

The thickness of the insert may also vary depending upon a number of factors such as whether and to what level the matrix material is activatable or expandable. The thickness may also be dependent upon the volume of open space between the first and second members to be filled, and/or the thickness of the isolator in the sealant material. Still further, the thickness may be based upon the pliability of the matrix material. Examples of suitable thicknesses include less than 10 mm, 5 mm, 2 mm, 0.3 mm or less. Accordingly, it is contemplated that the insert has a continuous thickness in the range of 0.1 mm to 10 mm or even 2 mm to 5 mm or otherwise.

The insert 10 may be applied to a generally planar surface or a generally non-planar (e.g., varying surface such as arcuate, pointed, ribbed, depressed, edged, or otherwise, or any combination thereof). It is contemplated that upon the application of the insert 10 to the non-planar surface, one or more portions of the non-planar surface (e.g., connection region) may be free of contact with the insert 10 such that a gap between the insert and the portion(s) of the non-planar surface may be formed. It is further contemplated that upon the application of the insert 10 to the non-planar surface (e.g., bending of the insert about the non-planar surface), one or more portions of the insert 10 may "bunch" together (e.g., folding of the insert onto itself, or otherwise). "Bunching" of the insert may also form a gap(s) between the insert 10 and the second member upon joining the second member to the first member (having the insert 10 located thereon). It should also be appreciated that through the activation of the matrix material, the matrix material may wet to fill any gaps, to reduce or eliminate any "bunching," or a combination of both formed between the first and second members.

The insert 10 may be applied to both planar and non-planar surfaces with limited or no gaps formed or bunching occurring. However, it is appreciated that the insert may be applied to a non-planar surfaces or surfaces resulting in gaps and/or bunching. Accordingly, the insert 10 of the present invention may further include at least one aperture 25 (e.g., opening, slit, or otherwise) to assist in deforming the insert so that the shape of the insert generally corresponds to the non-planar surface. The aperture 25 may be formed during the creation (e.g., weaving, molding, extruding, or otherwise) of the insert or may be included in a separate step such as by die cutting or otherwise to a preformed insert. The insert 10 having the aperture 25 may be applied to the generally non-planar or varying surface to accommodate various profile changes along the surface of one or both of the first and send members. When included, the aperture 25 may assist in extending the insert along the non-planar surface so that gaps, or other inconsistencies (e.g., bunching of the insert or otherwise) may be reduced or eliminated between the first and second members.

It is believed that by providing the insert 10 with the aperture 25, the insert 10 may become more formable (e.g., pliable, bendable, or otherwise) or more complementary (e.g., in size and/or shape) to the connection region of the non-planar surface so that a substantial portion of the insert may be in direct contact with the connection region along the non-planar surface while reducing or eliminating gaps or otherwise formed therebetween. It is further appreciated that in bending the insert 10, "bunching" of the insert may occur in one or more areas to accommodate the changes in the profile and to reduce or eliminate gaps between the insert and the non-planar surface. As shown in FIGS. 10A-11B, the aperture 25 may be positioned along a portion of the insert such as along an edge portion 26, FIGS. 10A and 10B, within a central portion 27, FIGS. 11A and 11B, or both. The aperture 25 may longitudinally extend along portions of the insert or may extend along the entire insert. It is also appreciated that the aperture 25 may transversely extend through a portion of the insert 10. However, in a preferred embodiment, the aperture 25 transversely extends completely through the insert 10 to form a through-hole.

Figure 10A:
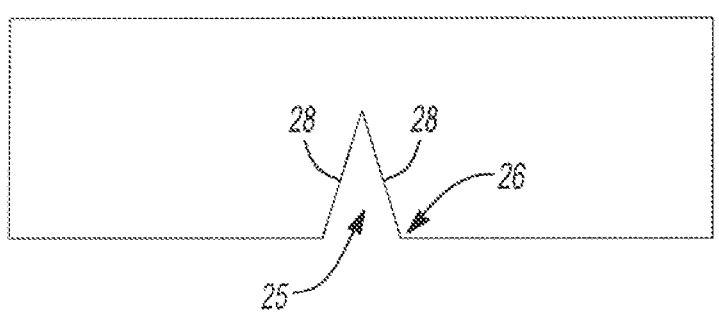
FIG. 10A illustrates a top view of another configuration of the structural mounting insert according to the teachings of the present invention.
Figure 10B:
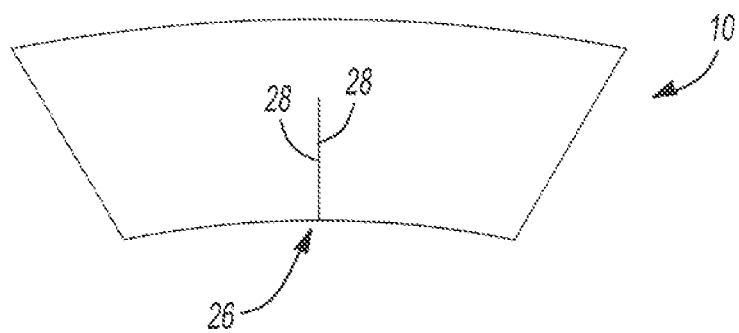
FIG. 10B illustrates the top view of structural mounting insert shown in FIG. 10A after being applied to a mounting surface.
Figure 11A:
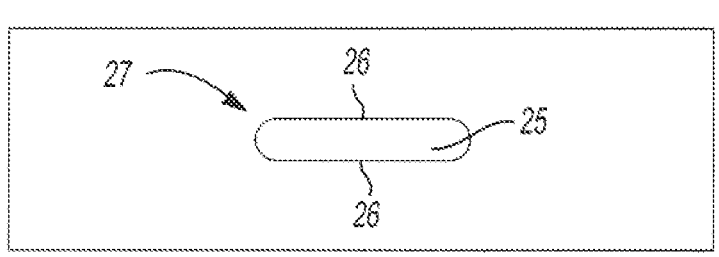
FIG. 11A illustrates a top view of yet another configuration of the structural mounting insert according to the teachings of the present invention.
Figure 11B:
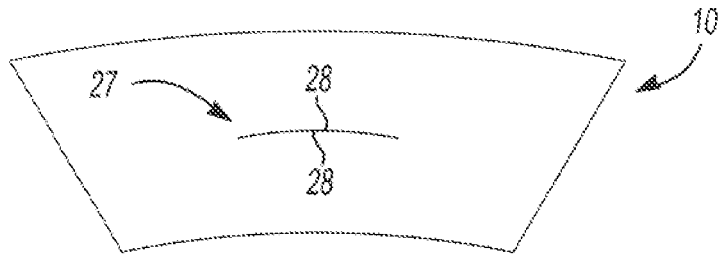
FIG. 11B illustrates the top view of structural mounting insert shown in FIG. 11A after being applied to a mounting surface.

Upon application of the insert 10 with the aperture 25 to the non-planar surface (e.g., the insert bends about the non-planar surface), edges 28 (e.g., perimeter edges) of the aperture 25 may be at least partially, substantially, or even completely brought together as the insert 10 conforms (e.g., bends or corresponds) to the profile of the non-planar surface so that the aperture 25 may be substantially reduced or eliminated, FIGS. 10B and 11B. For example, the edges 28 of the aperture 25 may be brought into general contact or proximity so that the aperture 25 may be substantially reduced or eliminated (i.e., a substantial amount being a sufficient amount that upon activation of the matrix material, the remaining portion of the opening becomes completely enclosed). A "substantial" amount of reduction being a sufficient an amount that upon activation of the insert (e.g., matrix material) the remaining portion of the aperture 25 may be completely enclosed (e.g., filled). It is appreciated that upon activation of the insert, the matrix material wets and/or expands to enclose the apertures 25 or any remaining gaps between the insert and the first and second members so that insert resists any displacement that would bring the first and second members into direct contact and/or to seal the connection region between the first and second members (e.g., dissimilar materials) from the surrounding environment.

In one non-limiting example, gaps and/or "bunching" between the insert and the non-planar surface may occur in applications having a generally rigid insert (e.g., an isolator formed of glass fibers or the like). As such, it is appreciated that the aperture 25, when included, may provide the insert with increased flexibility (e.g., becoming more pliable) to accommodate and to conform to the non-planar surface thereby reducing and/or eliminating gaps, "bunching", or both relative to an insert without the aperture 25 as applied to the generally same non-planar surface.

The insert may be applied to a first material such as a release paper to form a release layer on the insert by contacting the release layer with the matrix material and/or the isolator. Thereafter, the first material may be removed from the insert thereby leaving the matrix material with the isolator. The insert may be applied to a second material such as a synthetic material that has a film to form a handling layer. The handling layer at least partially covers an outer surface of the insert (e.g., matrix material) for providing a substantially non-tacky or tack free surface. Examples of such release film and handling film materials are disclosed in commonly owned, co-pending U.S. Patent Publication No. 2008/0254214, hereby incorporated by reference.

It should be appreciated that the matrix material while in contact with the isolator, includes a first tackiness in its green state such that the first tackiness may be sufficiently high so that it resists displacement after application to a surface of either the first and second members. The insert may further include an outer surface having a second tackiness that may be less tacky than the first tackiness. For example, the insert may include a removable release film in contact with the matrix material having the first tackiness and a handling film in contact with the outer surface having the second tackiness that is substantially tack free.

In another aspect, the insert may be formed of hydrophobic materials or may be laminated to become hydrophobic.

In yet another aspect, the insert may be formed using different forming techniques. In one preferred forming technique, the matrix material and the isolator may be formed by co-extrusion. However, other techniques are available.

Method of Use

Referring to FIGS. 3-7B and FIGS. 10A-11B, two examples of use of the insert of the present invention are shown, respectively. The present invention is particularly suited for fastening (e.g. riveting or otherwise) systems for joining and maintaining a distance between two or more members to prevent direct contact thereof. The insert, as described herein, is placed between a first and second member 12, 14 prior to attachment of the same. The first and second members are then brought together and an application of force 'F' is applied, through the use of fastening devices, or otherwise.

It should be appreciated that in bringing the first and second members together, the second member is applied to the insert, which is located along the first member. As the second member contacts the insert, the one or more openings formed in the isolator may be displaced such that the opening may be expanded in size. In a preferred embodiment, the insert includes an isolator having a consistent opening configuration (e.g., similarly sized opening as discussed herein) so that undue displacement (e.g., expansion of the opening that may result in direct contact between the first and second members) of the opening size may be resisted relative to an insert that includes an isolator having a variable opening configuration (e.g., differently sized openings).

As shown in the two examples, openings (e.g., gaps, or otherwise) may be formed between the isolator and the first and second members 12, 14. These openings may be partially or completely filled by the insert before activation of the matrix material, after activation of the matrix material, or both. For example, during attachment of the first and second member, the bringing into contact of second member to the first member having the insert, the generated torque formed during attachment (e.g., fastening) of the first and second members, or both may cause the matrix material located over the isolator to displace and partially or completely fill the open spaces or otherwise prior to activation. Alternatively, or in addition to pre-activation filling of the open spaces, during activation of the matrix material the open spaces may be additionally filled with an expanding matrix material.

Referring to FIG. 5 as the force is increased, the matrix material comprising the matrix material (e.g., sealing material) is displaced into the openings, into the aperture 25, and/or outside of the end portion of the isolator. This displacement continues until the first and second member contact the isolator. At this point the isolator acts as a spacer to form and maintain a substantially continuous gap between the first and second member so that the first and second members are substantially free of direct contact. As previously mentioned, the isolator may be suitable in strength so as to provide a reactionary force to the applied force without substantial deformation. For example, in one embodiment, the insert upon being subjected to a force sufficient to deflect it may be capable of elastically returning to its original state. However, in another embodiment, the insert upon being subjected to a force sufficient to deflect it, may permanently deform. It should be appreciated that the isolator 20 may be configured to deform (e.g., bend) towards the surface of either of the first and second members (e.g. one or more non-planar surfaces) so that the profile (e.g., shape) of the insert substantially conforms (e.g., corresponds) to the surfaces of the first and second members.

As shown in FIG. 6 and with the first and second members attached, the matrix material may be activated, which in one preferred configuration causes the matrix material to expand and fill any openings formed by the isolator or open spaces formed between the edges of the aperture 25. Also, it should be appreciated that the matrix material outside of the isolator also expands to form a seal about the entirety of the isolator. At this point, the contact regions of the first and second members and the insert are entirely sealed from the surrounding environment.

Figure 7A:
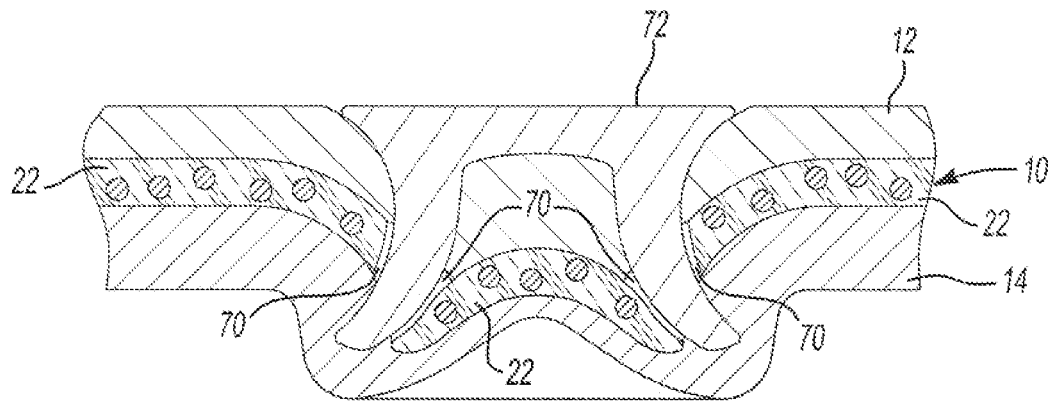
FIG. 7A illustrates a cross sectional view similar to that shown in FIG. 5, but instead taken through a mounting feature used to join the two members.
Figure 7B:
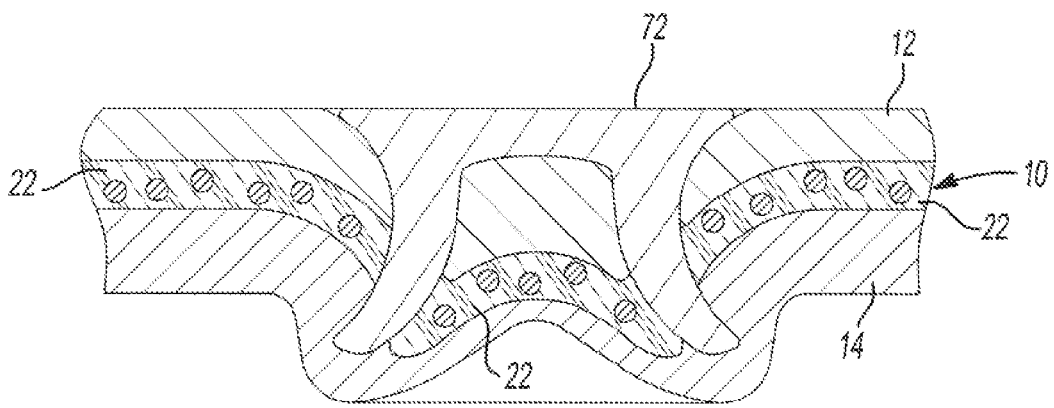
FIG. 7B illustrates the cross sectional view shown in FIG. 7A, after activation of one available material according to the teachings of the present invention.
Figure 8A:
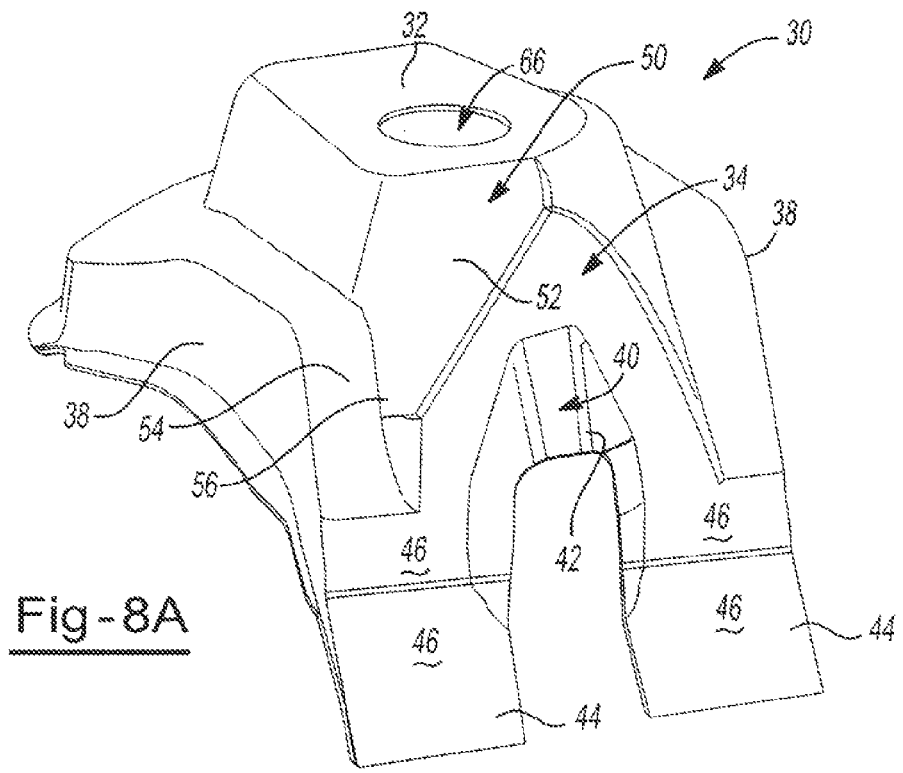
FIG. 8A-9B illustrates examples of several applications of the structural mounting insert according to the teachings of the present invention
Figure 8B:
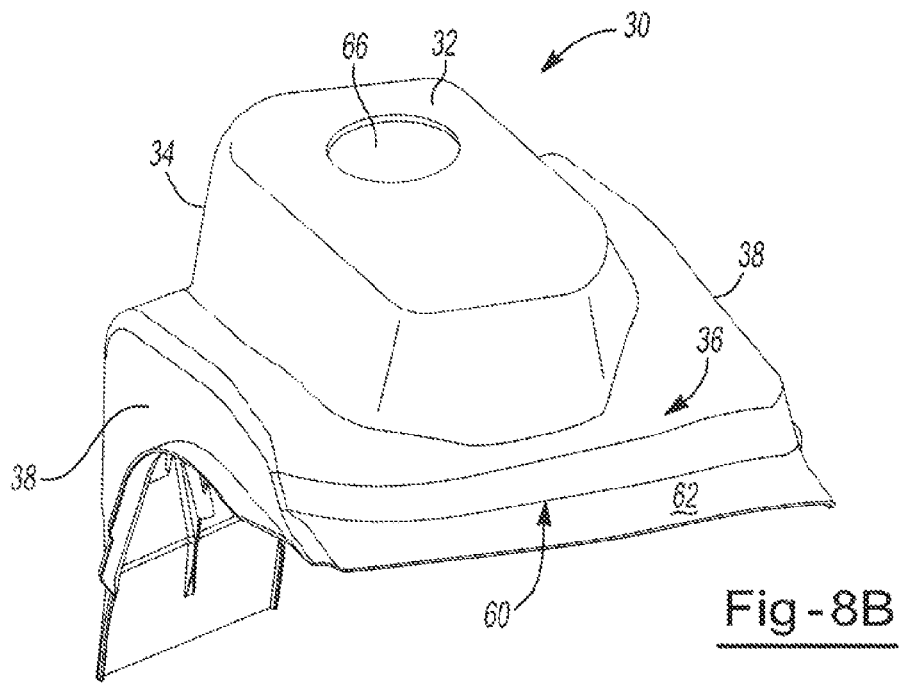
Figure 9A:
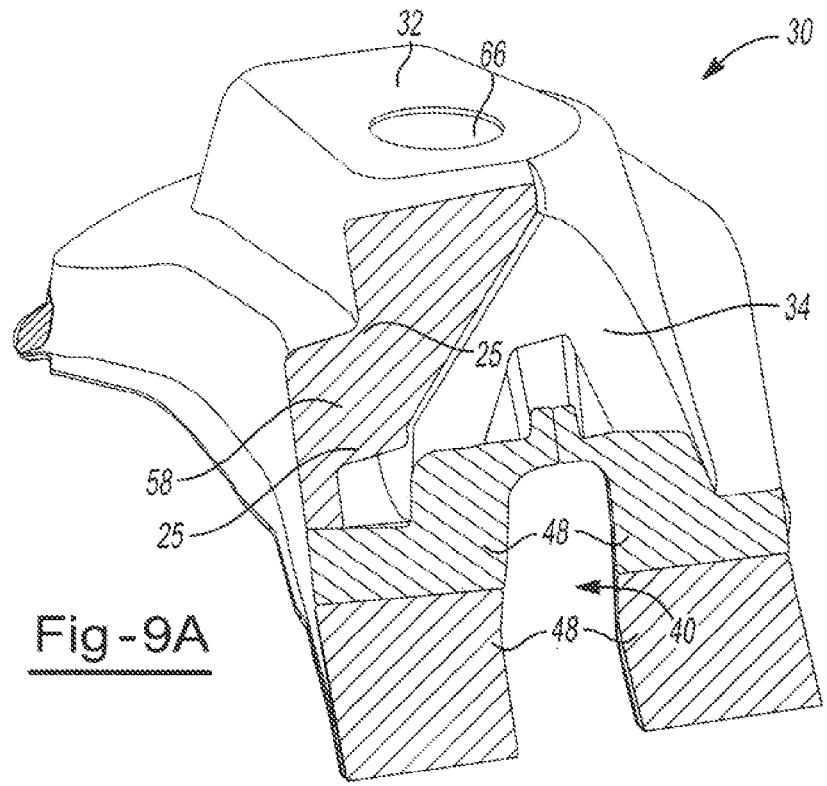
Figure 9B:
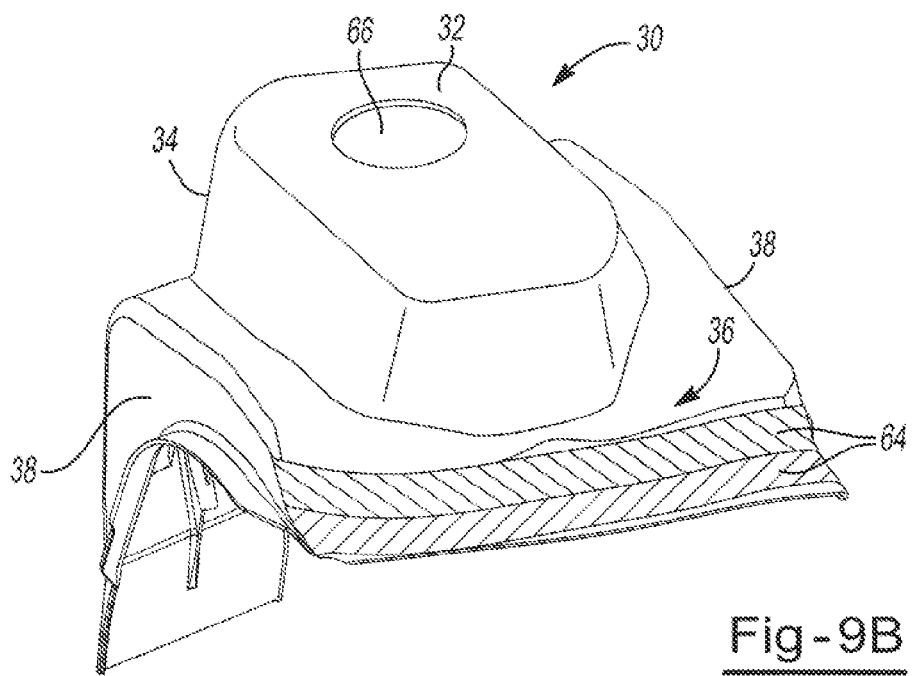

It is contemplated that openings are formed through the insert during the application of the fasteners (e.g., rivets) to the first and second members. Upon penetration of the fastener through the insert, the matrix material fills the surrounding area where the fastener extends therethrough to form a seal. However, in one specific non-limiting example as shown in FIG. 7A, open spaces 70 may form between the fastener 72 such as a rivet (e.g., self piercing rivet by Henrob) and one or more of the first member, the second member, and the insert during the fastening of a rivet into the joint. As Shown in FIG. 7A, the rivet extends through the first member (e.g., steel) and the connection regions (including the insert) to the second member (e.g., aluminum) such that an end portion of the rivet pierces the second member, but does not extend entirely therethrough). It is appreciated that upon activation, the matrix material (e.g., expandable material) expands to fill the openings and/or open spaces formed where the rivet extended therethrough to substantially limit or prevent moisture from entering therein as shown in FIG. 7B. For example, it is believed that as the generally hollow fastener extends through the insert (e.g., connection region), a portion of the matrix material may be displaced within the hollow cavity of the fastener such that upon activation, the matrix material expands to seal the open spaces inside and outside (e.g., perimeter) of the fastener and limit or prevent moisture entering therein.

One Specific Example

Referring to FIGS. 8A-9B, one non-limiting example, and use, of the structural mounting insert of the present invention is shown. In this example, it should be appreciated that any of the embodiments (e.g. isolators or otherwise) may be used. In this configuration a shock tower housing 30 is provided for accessing a shock absorber assembly and for mounting to an inner apron component and one or more frame members of an automotive vehicle (e.g., an inner front apron, a support member, a reinforcement member. The shock tower includes an outer wall extending from a first housing portion 32. The outer wall extending generally transversely to the first housing portion to form a cavity therebetween. The first housing portion 32 includes an opening 66 extending through the first housing portion to the internal cavity formed by the outer wall. The opening 66 is configured for accessing an end portion of a shock absorber located within the cavity (not shown). The outer wall includes generally opposing first and second wall portions 34, 36, respectively, and side wall portions 38, therebetween. The housing further includes a first mounting portion 40 of the first wall portion for attachment along a connection region to a first vehicle frame member. The first mounting portion 40 includes a main body portion 42 with arms 44 extending therefrom, the main body portion and the arms having a mounting surface 46 for receiving one or more inserts 48.

The housing also includes a second mounting portion 50 of the first wall portion for attachment along a connection region to a second vehicle frame member. The second mounting portion includes a first mounting surface 52 to a second mounting surface 54, with an interconnecting non-planar mounting surface 56, generally extending therebetween for receiving one or more inserts 58.

The housing further includes a third mounting portion 60 for attachment along a third connection region to a third vehicle frame member (e.g., an interior apron member). The third mounting portion extending along the second wall portion of the housing on an opposite side generally opposing the first and second mounting portions along the first wall portion. The third mounting portion includes mounting surfaces 62 for receiving one or more inserts 64.

The shock tower housing further includes structural mounting inserts 48, 58, and 64 as described herein. As shown, the inserts 48, 58, and 64 are formed of various shapes relative to the corresponding connection region of the first vehicle support member, the second vehicle support member and the interior apron member, respectively. The insert 58, further includes apertures 25 formed therein at predetermined locations so that upon application to the second mounting connection region, the apertures are positioned along the non-planar surface between the first and second mounting surfaces of the second mounting connection region.

The first, second, and third mounting connection regions are positioned relative to the respective member to form an overlap with the insert therebetween. The overlap will receive a rivet fastener that extends through an opening formed therein through the overlap for further securement of the joint.

Examples

Surfaces in contact with the insert in accordance with the present invention are capable of obtaining satisfactory shear strengths. For example, the lap shear test includes two EG-60 test substrates of similar dimensions (e.g., each being about 25 mm Width×120 mm Length×0.8 mm Thickness). Applying a strip of sealant material across the width of the first test substrate, near the end portion thereof. Joining the end portion of second test substrate to the sealant material located on the first test substrate such that the test coupons extend along the same axis and the joined ends of the first and second test substrates overlap one another with the sealant material located therebetween to form an overlap portion (e.g., bond area of about 45 mm×10 mm). The overlap portion is sufficient to provide failure in the sealant material, and not in the test substrate. Thereafter, the test substrates are cured.

Each test substrate is pulled in tension (e.g., in opposite directions generally along the same axis) at a speed of about 20 mm/min using a laboratory test frame such as an Instron until the load drops off.

Test samples are prepared including EG-60 substrates being joined by the insert including the matrix material with an isolator). After applying the insert and contacting the surfaces of the insert with the substrates to form a joint, the test sample is cured and the shear strength is determined. The test samples achieved shear strengths from about 14.7 MPa to about 16.3 MPa (e.g., about 15.6 MPa using a glass scrim isolator material) and from about 13.4 MPa to about 15.0 MPa (e.g., about 14.1 MPa using a fiberglass mesh isolator material) at a bondline of about 0.25 mm. Furthermore, the test samples achieved shear strengths from about 11.6 MPa to about 13.8 MPa (e.g., about 12.6 MPa using a sandpaper mesh isolator such as Norton Durite Q421, type p220) and from 10.6 MPa to 13.8 MPa (e.g., about 11.9 MPa using a polymeric mesh isolator material such as Dexmet) at a bondline of about 0.65 mm. Yet even further, the test samples achieved shear strengths from about 10.6 MPa to about 13.8 MPa (e.g., about 13.4 MPa using a metal mesh isolator material) at a bondline of about 0.75 mm. As discussed herein, the bondline refers to the distance between the internal surfaces of the first and second members with the activated (e.g., cured) sealant material therebetween.

It should be appreciated that the reinforcing system of the present invention may include a bondline between about 0.1 to about 2 mm, or between about 0.25 mm to about 0.75 mM.

It should also be appreciated that the reinforcing system of the present invention may be utilized to provide shear strengths of at least 8.0 MPa, preferably at least about 12.0 MPa, and more preferably at least about 14.0 MPa.

Other Applications

The reinforcing system of the present invention may be utilized in various aspects of structural reinforcement, particularly in the transportation industry for motorcycles, bicycles, automotive vehicles, boats, trains, or otherwise. In one particularly advantageous application, the reinforcing system of the present invention may be used for applications where dissimilar metal components are joined together and wherein such components are commonly exposed to moisture. In these configurations, the insert (e.g., non-metallic insert) of the present invention provides solid mounting of such components while providing a continuous spacer layer to prevent direct contact of the dissimilar materials thereby protecting the same from corrosion. Additional components for which the present invention can be useful include, without limitation hinge assemblies, door latch assemblies, front and rear bumper systems, lift gates, underbody reinforcements, or the like.

It should be appreciated that the reinforcing system of the present invention may be used in body repair shops, in general assembly plants, or otherwise. Not only does the reinforcing system provide improved attachment for two or more components during original manufacturing, but also provides improved attachment for components which integrity (e.g. strength or otherwise) has be jeopardized, such as during an accident.

The present invention, as has been discussed can provide multiple advantages. As one example, an individual, machine or combination thereof can fasten (e.g., riveted, welded, bolt, screw or otherwise affix) two or more dissimilar surfaces or members together and limit or prevent direct contact thereof, corrosion and/or loosening of the fasteners (e.g., torque fall off). The limiting or prevention of direct contact of the two dissimilar materials can be accomplished, in one preferred embodiment, by drawing or forcing together or tightening of the surfaces or members together (e.g., via the fasteners until contact (e.g., metal to non-metal contact) is achieved between the members or surfaces and the isolator. The surfaces or member can continue to be drawn or forced together to produce a compressive force upon the isolator that does not experience an undesirably high amount of creep that can be caused by time passing and/or temperature changes. In this manner, the insert, more particularly, the isolator maintains a spacer layer between the dissimilar materials while the matrix material extends through the openings of the isolator for contact with the dissimilar materials thereby sealing any open spaces formed therebetween. The present invention, in turn, can then limit or eliminate replacement and/or repairs to the reinforcing system resulting from corrosion of one or both of the dissimilar materials.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An insert for adhesion, sealing, and isolating comprising:
    a generally non-conductive isolator having a melting point or glass transition temperature greater than about 115° C.;
    a matrix material in contact with the generally non-conductive isolator, the matrix material having a tackiness in a green state, the matrix material being cured by exposure to heat after installation of the insert, wherein the tackiness is sufficiently high so that the matrix material resists displacement after application to a surface;
    wherein upon installation in a joint between dissimilar materials the insert bonds the two dissimilar materials and resists any displacement that would bring the two dissimilar materials into direct contact with one another.

2. The insert of claim 1, wherein the isolator includes a network of elongated fibers that are constrained relative to each other against lateral displacement.

3. The insert of claim 2, wherein the insert expands and contracts during cycles of warming and cooling of the dissimilar materials so that moisture is substantially limited or prevented from entering a gap between the two dissimilar materials.

4. The insert of claim 3, wherein the generally non-conductive isolator is formed of a hydrophobic material or is laminate that the isolator is hydrophobic.

5. The insert of claim 4, wherein upon activation of the matrix material the matrix material wets to fill any gaps, to reduce or eliminate any bunching, or both between the two dissimilar materials.

6. The insert of claim 5, wherein generally non-conductive isolator is one or more non-conductive threads or wires that include a polyamide, a polyester, glass fibers, or any combination thereof.

7. The insert of claim 1, wherein fiber wherein fibers within the isolator have a longitudinal axis oriented generally non-parallel with any contacting edge of any of the dissimilar materials.

8. The insert of claim 7, wherein the matrix material encases the generally non-conductive isolator.

9. The insert of claim 1, wherein an outer surface is part of a non-tacky handling film that lies over the matrix material.

10. The insert of claim 1, wherein the matrix material is expandable, upon exposure to an elevated temperature.

11. The insert of claim 10, wherein the isolator includes plastic, glass, ceramic, or rubber.

12. The insert of claim 11, wherein the isolator is free of metal.

13. The insert of claim 12, wherein the insert is used to join hinge assemblies, door latch assemblies, front and rear bumper systems, lift gates, or underbody reinforcements.

14. The insert of claim 12, wherein the isolator includes a melting point of at least about 200° C. and the isolator includes a glass transition to temperature of about 200° C.

15. The insert of claim 1, wherein the insert is capable of elastically returning to an original state upon being subjected to a force sufficient to deflect the insert.

16. The insert of claim 1, further including fasteners that join the two dissimilar materials, and
wherein the fasteners extend through the generally non-conductive isolator and the matrix material, the matrix material filling and surrounding an area where the fasteners extend therethrough forming a seal.

17. The insert of claim 16, wherein the insert expands and contracts during cycles of warming and cooling of the dissimilar materials so that moisture is substantially limited or prevented from entering a gap between the two dissimilar materials.

18. The insert of claim 1, wherein the matrix material is activatable or deformable so that when activated or deformed the matrix material seals contact points of the two dissimilar materials preventing exposure to corrosion driving components, which can corrode the joint between the two dissimilar materials.

19. An insert for adhesion, sealing, and isolating comprising:
an isolator having a melting point or glass transition temperature greater than about 200° C.;
a matrix material encasing the isolator, the matrix material having a tackiness in a green state, the matrix material being cured by exposure to heat after installation of the insert, wherein the tackiness is sufficiently high so that the matrix material resists displacement after application to a surface;
wherein upon installation in a joint betwe n two dissimilar materials the insert bonds the two dissimilar materials and resists any displacement that would bring the two dissimilar materials into direct contact with one another:
wherein the matrix material is activatable or deformable so that when activated or deformed the matrix material seals contact points of the two dissimilar materials preventing exposure to corrosion driving components, which can corrode the joint between the two dissimilar materials.

20. The insert of claim 10, wherein the insert expands and contracts during cycles of warming and cooling of the dissimilar materials so that moisture is substantially limited or prevented from entering a gap between the two dissimilar materials, and
wherein the isolator is one or more non-conductive threads or wires that include a polyamide, a polyester, glass fibers, or any combination thereof.

* * * * *

UNITED STATES PATENT AND TRADEMARK OFFICE
CERTIFICATE OF CORRECTION

PATENT NO. : 8,459,675 B2
APPLICATION NO. : 13/162628
DATED : June 11, 2013
INVENTOR(S) : Olaf Nitsche et al.

It is certified that error appears in the above-identified patent and that said Letters Patent is hereby corrected as shown below:

In the Claims:

Column 20, Claim 7, Line 60 after "claim 1," please delete "wherein fiber"
Column 22, Claim 19, Line 12 please delete "betwe n" and insert --between--

Signed and Sealed this
Third Day of September, 2013

Teresa Stanek Rea
*Acting Director of the United States Patent and Trademark Office*